United States Patent
Rule et al.

(10) Patent No.: US 6,632,874 B2
(45) Date of Patent: Oct. 14, 2003

(54) METHOD TO DECREASE ALDEHYDE CONTENT IN POLYOLEFIN PRODUCTS

(75) Inventors: Mark Rule, Atlanta, GA (US); Yu Shi, Conyers, GA (US); Linda Hsiaohua Liu, Dunwoody, GA (US); John V. Standish, Hudson, OH (US)

(73) Assignee: The Coca-Cola Company, Atlanta, GA (US)

( * ) Notice: Subject to any disclaimer, the term of this patent is extended or adjusted under 35 U.S.C. 154(b) by 246 days.

(21) Appl. No.: 09/846,648

(22) Filed: May 1, 2001

(65) Prior Publication Data

US 2002/0193481 A1 Dec. 19, 2002

(51) Int. Cl.$^7$ .................. B29D 22/00; C08L 23/00; C08L 23/18
(52) U.S. Cl. .............. 524/585; 220/592.16; 428/35.7; 524/582; 528/491; 528/492; 528/495
(58) Field of Search ................. 524/230, 232, 524/156, 252, 254, 255, 256, 257, 258, 200, 99, 386, 387, 388, 503, 582, 585; 528/486, 487, 489, 491, 492, 495; 428/35.7; 220/592.16

(56) References Cited

U.S. PATENT DOCUMENTS

| | | | |
|---|---|---|---|
| 3,926,736 A | 12/1975 | Bucolo | 195/103.5 |
| 3,956,324 A | 5/1976 | Jost | 260/368 |
| 4,340,453 A | 7/1982 | Noomem | 204/159.15 |
| 4,368,286 A | 1/1983 | Hayashi et al. | 524/394 |
| 4,552,791 A | 11/1985 | Hahn | 428/35 |
| 4,837,115 A | 6/1989 | Igarashi et al. | 428/36.92 |
| 4,840,981 A | 6/1989 | Hasuo et al. | 524/114 |
| 4,886,847 A | 12/1989 | Bastioli et al. | 524/84 |
| 4,894,404 A | 1/1990 | Minnick | 524/226 |
| 5,084,356 A | 1/1992 | Deak et al. | 428/458 |
| 5,085,904 A | 2/1992 | Deak et al. | 428/35.7 |
| 5,102,943 A | 4/1992 | Logullo | 524/487 |
| 5,112,741 A | 5/1992 | Palmer et al. | 435/25 |
| 5,258,233 A | 11/1993 | Mills et al. | 428/480 |
| 5,266,416 A | 11/1993 | Inoue et al. | 428/651 |
| 5,298,550 A | 3/1994 | Riccardi et al. | 524/513 |
| 5,340,884 A | 8/1994 | Mills et al. | 125/420 |
| 5,364,666 A | 11/1994 | Williams et al. | 427/579 |
| 5,378,510 A | 1/1995 | Thomas et al. | 427/563 |
| 5,389,710 A | 2/1995 | Dege et al. | 524/243 |
| 5,405,921 A | 4/1995 | Muschiatti et al. | 525/444 |
| 5,462,779 A | 10/1995 | Misiano et al. | 428/347 |
| 5,468,520 A | 11/1995 | Williams et al. | 427/560 |
| 5,510,155 A | 4/1996 | Williams et al. | 427/532 |
| 5,531,060 A | 7/1996 | Fayet et al. | 53/426 |
| 5,587,191 A | 12/1996 | Donsbach et al. | 426/66 |
| 5,616,369 A | 4/1997 | Williams et al. | 427/536 |
| 5,650,469 A | 7/1997 | Long et al. | 525/425 |
| 5,658,628 A | 8/1997 | Ishii et al. | 428/516 |
| 5,663,223 A | 9/1997 | Teumac | 524/109 |
| 5,670,224 A | 9/1997 | Izu et al. | 428/35.8 |
| 5,691,007 A | 11/1997 | Montgomery | 427/576 |
| 5,704,983 A | 1/1998 | Thomas et al. | 118/723 |
| 5,856,385 A | 1/1999 | Mehrer et al. | 524/108 |
| 6,274,212 B1 | 8/2001 | Rule et al. | 428/36.92 |

FOREIGN PATENT DOCUMENTS

| | | |
|---|---|---|
| EP | 0460796 A2 | 12/1991 |
| EP | 0 488 605 A2 | 6/1992 |
| EP | 0 545 442 A1 | 12/1992 |
| EP | 0 801 102 | 10/1997 |
| WO | WO96/04833 | 2/1996 |
| WO | 96/35740 | 11/1996 |
| WO | WO97/28218 | 8/1997 |
| WO | WO 00/66659 | 4/2000 |
| WO | 01/02489 A1 | 1/2001 |

*Primary Examiner*—Peter Szekely
(74) *Attorney, Agent, or Firm*—Sutherland Asbill & Brennan LLP

(57) ABSTRACT

Methods are provided for decreasing aldehyde content in polyolefin materials comprising combining with the polyolefin material an organic additive compound which reacts with aldehydes to form water and a resulting organic compound. The organic additive compound comprises at least two hydrogen-substituted heteroatoms bonded to carbons of the organic additive compound such that the organic additive compound is reactive with aldehydes present in the polyolefin to form water and the resulting organic compound, which comprises an unbridged five- or six-member ring including the at least two heteroatoms. The resulting organic compound advantageously neither imparts an off-taste to food and beverage products in contact with the polyolefin nor discolors the polyolefin. Preferred polyolefins include polypropylene and polyethylene.

29 Claims, No Drawings

METHOD TO DECREASE ALDEHYDE CONTENT IN POLYOLEFIN PRODUCTS

FIELD OF THE INVENTION

The present invention generally relates to polyolefin products such as polyethylene and polypropylene packaging materials for food and beverages. More particularly, this invention relates to reduction of aldehydes in polyolefins by incorporation of additives capable of reacting with these aldehydes.

BACKGROUND OF THE INVENTION

Polyolefins, particularly polyethylene and polypropylene, are utilized extensively across a wide range of industries in a variety of product forms, including fibers, films, and three-dimensional structures. A particularly important application for polyolefins is containers, especially for food and beverages. Polyolefin materials often are selected for use in food and beverage packages and closures because they are inexpensive, lightweight, easily modified, and impact resistant. Yet despite these advantages, polyolefins can have certain undesirable attributes. For example, they frequently contribute "off-taste" to packaged products, particularly sensitive products such as water. This off-taste commonly is referred to as a "plastic" off-taste. It would be highly desirable to reduce or eliminate this off-taste from products packaged in polyolefin materials.

One approach that has been taken to mitigate the off-taste problem in the non-polyolefin polymer polyethylene terephthalate (PET) is to incorporate additives that are scavengers for aldehydes that are produced by degradation of the PET itself during heat processing of the polymer. U.S. Pat. No. 4,837,115 to Igarashi discloses incorporating additives of amine-group terminated polyamides and amine-group containing small molecules into PET, wherein the additives selectively react with acetaldehyde (AA) that is generated in the PET. Igarashi teaches that the amine groups are effective because they can react with AA to form imines, where the amine nitrogen forms a double bond with the AA moiety. Igarashi teaches that essentially any amine is effective. Mills (U.S. Pat. Nos. 5,258,233; 5,650,469; and 5,340,884) and Long (U.S. Pat. No. 5,266,416) disclose the use of various polyamides, especially low molecular weight polyamides, while Turner and Nicely (PCT WO 97/28218) disclose the use of polyesteramides. These polyamides and polyesteramides are believed to react with AA in the same manner as described by Igarashi. While these AA scavengers are effective at reducing the AA content of melt-processed PET, they suffer from their own drawbacks. In particular, relatively high loadings of the polyamides are needed to effect significant AA reductions, and a significant yellowing of the PET occurs from incorporation of these amine-containing additives. This coloring is believed to be due to the inherent color of the imine group, which for most applications is undesirable because most polyolefin articles in use today are clear and uncolored.

U.S. Pat. No. 5,663,223 to Teumac discloses using a polymeric liner that includes inorganic sulfites or organic hydrazides as flavor protectant compounds. These compounds are added to scavenge oxygen that otherwise could react with the polymer or additives therein to form off-taste producing aldehydes. Incorporation of these compounds into polyolefins is difficult, however, because these protectant compounds have an extremely low thermal stability. Furthermore, these compounds may themselves contribute to an off-taste in sensitive products, and hydrazides react with aldehydes to form hydrazones, which often are highly colored. Such colors oftentimes are unwanted, as many applications require or desire that the polyolefin packaging be white or clear.

A simple and economical method is therefore needed for reducing aldehyde content in polyolefin products without using aldehyde-scavenging agents that impart an off-taste to products packaged in containers made from polyolefins or that impart a color to such polyolefin containers.

It is therefore an object of the present invention to provide methods for decreasing aldehyde content of products in contact with polyolefin packaging materials.

It is another object of the present invention to provide methods for decreasing aldehyde content in polyolefin materials without coloring the polyolefin materials and without creating another source of product off-taste.

It is a further object of the present invention to provide polyolefin packaging containers which provide a decreased aldehyde content of products contained therein.

SUMMARY OF THE INVENTION

Methods are provided for decreasing the aldehyde content in polyolefin materials by combining the polyolefin material with an organic additive compound that reacts with aldehydes to form water and a resulting organic compound. The organic additive compound comprises at least two hydrogen-substituted heteroatoms bonded to carbons of the organic additive compound such that the organic additive compound is reactive with aldehydes present in the polyolefin to form water and the resulting organic compound, which comprises an unbridged five- or six-member ring including the at least two heteroatoms. The resulting organic compound neither imparts an off-taste to food and beverage products in contact with the polyolefin nor discolors the polyolefin.

The organic additive compound can be added at relatively low levels to the polyolefin and still sufficiently decrease the aldehyde content of the polyolefin. The organic additive compound preferably is substantially thermally stable at the melt processing temperature of the polyolefin. Preferred organic additive compounds include anthranilamide, 3,4-diaminobenzoic acid, malonamide, tryptophan, and allantoin.

DETAILED DESCRIPTION OF THE INVENTION

It has been discovered that the off-taste from beverage and food products packaged in polyolefin materials is in fact largely due to the migration of $C_8$ through $C_{10}$ aldehydes from the polyolefin into the products, and that these aldehydes typically are the degradation products of various unsaturated additives used as processing aids in the polyolefins. These additives degrade chemically, thermally, or by photo-oxidation to yield these undesirable aldehydes. Examples of processing aid additives are erucic acid derivatives, such as erucamide, which often is used as a processing aid additive due to its efficacy and low cost. Although one might propose eliminating the processing aid additives as a solution to the aldehyde problem, the processing properties provided by the unsaturated additives are important and not readily duplicated. It thus is desirable to continue the use of unsaturated additives while simultaneously minimizing or eliminating the off-taste caused by their degradation. Methods therefore have been developed for substantially decreasing the aldehyde content of processed polyolefins by incorporating low levels of an organic additive compound into the polyolefin, such as during melt processing. The organic additive compound scavenges the aldehyde present in the polyolefin by chemically reacting with the aldehyde.

The Aldehyde-Containing Polyolefin

The present method is useful for removing aldehydes from a variety of polyolefin materials. In preferred embodiments, the polyolefin is polypropylene (PP) or polyethylene (PE). Other useful polymers include polyisoprene, polystyrene, poly(vinyl chloride), and poly(methylmethacrylate). The present method can be used with essentially any polyolefin polymer in which unsaturated additives have been incorporated.

Polyolefins, such as PP and PE, can be processed to form films, sheets, and three-dimensional articles, which can be used as or in packaging containers and closures. As part of the processing of the polyolefin, for example, melt-processing (e.g., extrusion and molding), processing aids typically are added to achieve favorable product properties and/or to improve ease of polymer processing. Representative types of processing aid additives include internal lubricants, external lubricants, and viscosity modifiers. Many of these processing aid additives are unsaturated compounds. Euramide, for example, often is added to polyethylene and polypropylene to act as a lubricant to improve handling and prevent the polymer product from sticking to itself. Other unsaturated additives that may generate the off-taste aldehyde include vegetable oil derivatives and castor oil derivatives. These unsaturated processing aid additives are known to degrade thermally, chemically, or by photo-oxidation to generate aldehydes in the polyolefin material. The aldehydes particularly identified as causing off-taste in products are octanal, nonanal, and decanal (i.e. the $C_8$ through $C_{10}$ aldehydes).

The Organic Additive Compound

Suitable organic additive compounds effective in the method described herein are characterized as small molecules that include at least two hydrogen-substituted heteroatoms bonded to carbons of the organic additive compound such that the organic additive compound is reactive with aldehyde in the polyolefin to form water and a resulting organic compound comprising an unbridged 5- or 6-member ring including the at least two heteroatoms. Unlike prior art methods that depend on the formation of inherently colored imines, the formation of unbridged 5- or 6-member ring structures do not inherently result in color formation. Moreover, thermodynamics often favor ring formation more than imine formation; therefore, significantly lower amounts of the organic additive compound described herein can effectively decrease the aldehyde content in processed polyolefins.

Heteroatoms capable of reacting with the aldehyde include oxygen (O), nitrogen (N), and sulfur (S). The heteroatoms of the additive compound should have at least one bond to an active hydrogen (H), and in the course of condensing with the aldehyde should split off water. Preferred functional groups containing these heteroatoms include amine ($NH_2$ and NHR), hydroxyl (OH), carboxyl ($CO_2H$), amide ($CONH_2$ and CONHR), and thiol (SH). It is necessary for these functional groups to be sterically arranged so that upon condensation with the aldehyde an unbridged 5- or 6-member ring can be formed. The structural arrangement preferably allows the formation of a six-member ring. Furthermore, it is especially preferred that heteroatoms of the organic additive are attached to a preformed ring or rings. The preformed ring(s) most preferably are aromatic so that the unbridged 5- or 6-member ring of the resulting organic compound is bonded to the aromatic ring.

The organic additive compound preferably is substantially thermally stable at the temperatures required for melt-processing the polyolefin. The organic additive compound also preferably includes functional groups that include the heteroatoms and active hydrogens and that are relatively unreactive toward other additives, if any, present in the polyolefin. High thermal stability and low reactivity to other additives increase the amount of unreacted organic additive compound that is available for condensation with the aldehyde, thus reducing the amount of organic additive compound needed to achieve effective levels of aldehyde scavenging. Compounds with decomposition temperatures greater than 200° C. as measured by Thermal Gravimetric Analysis (TGA) are most preferred. Compounds that decompose by intramolecular elimination reactions at temperatures less than about 200° C. are less likely to be effective.

Examples of organic additive compounds that satisfy these parameters and that are effective at decreasing the aldehyde content of product in contact with polyolefins include anthranilamide, salicyclamide, salicylanilide, o-phenylenediamine, 3,4-diaminobenzoic acid, 1,8-diaminonaphthalene, o-mercaptobenzamide, N-acetylglycinamide, malonamide, 3-mercapto-1,2-propanediol, histidine, tryptophan, 4-amino-3-hydroxybenzoic acid, 4,5-dihydroxy-2,7-naphthalenedisulfonic acid disodium salt, biuret, 2,3-diaminopyridine, 1,2-diaminoanthraquinone, dianilinoethane, allantoin, 2-amino-2-methyl-1,3-propanediol, pentaerythritol, dipentaerythritol, and poly(vinyl alcohol). Preferred organic additive compounds include anthranilamide, 3,4-diaminobenzoic acid, malonamide, tryptophan, and allantoin. Anthranilamide and 3,4-diaminobenzoic acid are most preferred.

The amount of organic additive compound necessary to achieve the desired decrease in aldehyde content is dependent on which specific additive compound is used and the amount of reduction required. Organic additive compounds that are relatively more effective can achieve greater than 90% reduction in aldehyde content at loadings of between 200 and 500 ppm; additives that are relatively less effective may require addition levels up to 1000 ppm.

Using the Organic Additive Compound

The method of incorporating the organic additive compound into the polyolefin is not critical. For example, the organic additive compound can be dispersed in a liquid carrier which is then mixed with polyolefin pellets immediately before injection molding. The organic additive compound may also be incorporated by spraying a slurry of the additive in water onto the pellets prior to drying. In another embodiment, a melt or suspension of the organic additive compound is injected into pre-melted polyolefin. They also may be incorporated as a masterbatch pellet/pellet blend. The organic additive compound also may be incorporated by making a masterbatch of pellets of the additive compound with polyolefin and then mixing the masterbatch pellets with polyolefin pellets at the desired level before drying and injection.

The following equations illustrate the condensation reaction of suitable organic additive compounds described herein with an aldehyde (octanal) to form water and a resulting compound with an unbridged ring:

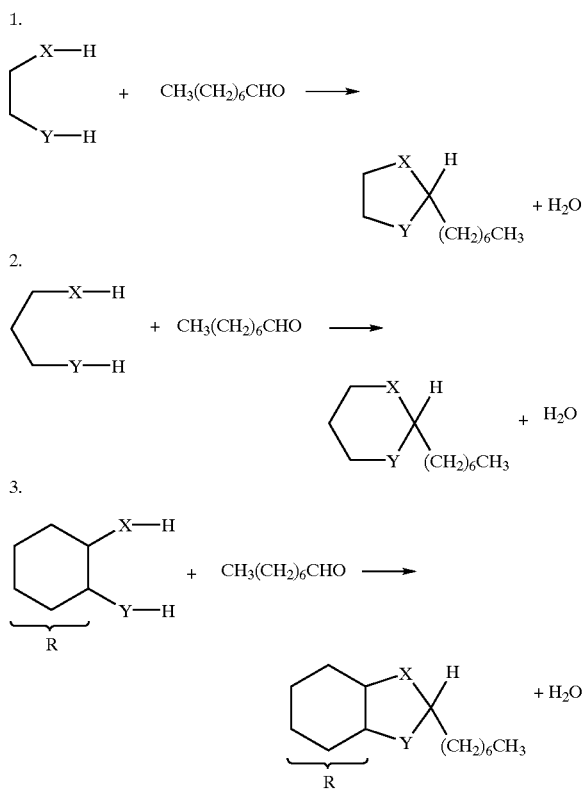

In the foregoing equations, X-H and Y-H represent functional groups including at least one active hydrogen represented by H and a heteroatom such as O, N, or S. In equation 3, $R_1$ represents a ring which can be a 5- or 6-member ring and can be aromatic or nonaromatic.

Using the Polyolefin Composition
Containing the Organic Additive Compound

The composition comprising the polyolefin and the organic additive compound is, because of the reduced aldehyde content, particularly suitable for making containers such as a container for use in packaging beverages. With the reduced aldehyde content, the containers impart less of an off-taste to the beverages. This is particularly important for beverages, such as water, which do not have a strong flavor. Particularly preferred polyolefins for use in beverage packaging include polyethylene and polypropylene. Containers can be made with the polyolefin compositions described herein using conventional methods such as injection molding and blow molding. A typical method includes forming a preform with the polyolefin and organic additive compound, and then blow-molding the beverage container. The resulting containers can be used in the manufacture of package beverages according to conventional manufacturing methods.

EXAMPLES

The compositions and methods described above will be further understood by reference to the following non-limiting examples. The examples illustrate the use of several different additives described herein for decreasing the aldehyde content of beverages in contact with polyolefins.

In examples 1–7, polypropylene plaques containing the additives were prepared. Each plaque also contained 0.5% erucamide. The efficacy of the additives were evaluated by placing approximately 1 gram of the plaque into 250 ml ozonated water (0.4 ppm ozone) in a glass bottle, holding for one and three weeks at 40° C., and then analyzing for the amount of nonanal present using GC-MS. All samples were run in duplicate. The results are shown in Table 1 below.

TABLE 1

Nonanal Content in Ozonated Water Contacted with Erucamide-Containing Polypropylene with Additives

| Example No. | Additive | ppm additive | ppb nonanal week 1 | ppb nonanal week 3 |
| --- | --- | --- | --- | --- |
| 1 | None | 0 | 3.1 | 4.7 |
| 2 | Dipentaerythritol | 1000 | 2.9 | 3.0 |
| 3 | Dipentaerythritol | 2000 | 2.2 | 3.6 |
| 4 | Anthranilamide | 1000 | 2.1 | 2.2 |
| 5 | Anthranilamide | 2000 | 1.9 | 1.8 |
| 6 | 1,2-diaminoanthrquinone | 1000 | 2.1 | 3.1 |
| 7 | 1,2-diaminoanthrquinone | 2000 | 2.0 | 3.2 |

Modifications and variations of the methods and compositions described herein will be obvious to those skilled in the art from the foregoing detailed description. Such modifications and variations are intended to come within the scope of the appended claims.

We claim:

1. A method for decreasing aldehyde content of a polyolefin comprising:
   combining with the polyolefin an organic additive compound which comprises an aromatic ring having at least two hydrogen-substituted heteroatoms bonded thereto,
   wherein the organic additive compound such that the organic additive compound is reactive with aldehyde in the polyolefin to form water and a resulting organic compound comprising an unbridged 5- or 6-member ring including the at least two heteroatoms.

2. The method of claim 1 wherein the aldehyde is selected from the group consisting of octanal, nonanal, and decanal.

3. The method of claim 1 wherein the heteroatoms include atoms selected from the group consisting of oxygen, sulfur, and nitrogen.

4. The method of claim 1 wherein the two heteroatoms are both nitrogen.

5. The method of claim 1 wherein the additive compound is selected from the group consisting of anthranilamide, salicyclamide, salicylanilide, o-phenylenediamine, 3,4-diaminobenzoic acid, 1,8-diaminonaphthalene, o-mercaptobenzamide, tryptophan, 4-amino-3-hydroxybenzoic acid, 4,5-dihydroxy-2,7-naphthalenedisulfonic acid disodium salt, 2,3-diaminopyridine, and 1,2-diaminoanthraquinone.

6. The method of claim 1 wherein the additive compound is anthranilamide or 3,4-diaminobenzoic acid.

7. The method of claim 1 wherein the additive compound is combined with the polyolefin in an amount between about 10 and about 1000 ppm.

8. The method of claim 7 wherein the additive compound is present in the polyolefin in an amount between about 200 and about 500 ppm.

9. The method of claim 1 wherein the organic additive compound comprises at least two functional groups including the at least two hydrogen-substituted heteroatoms, respectively, wherein the at least two functional groups are selected from the group consisting of amide, amino, hydroxyl, carboxyl, and thiol groups.

10. The method of claim 1 wherein the additive compound is substantially thermally stable at the melt-processing temperature of the polyolefin.

11. The method of claim 1 wherein the organic additive compound has a thermal decomposition temperature greater than about 200° C.

12. The method of claim 1 wherein the polyolefin is a polypropylene or polyethylene.

13. A container or closure made in accordance with a method comprising:

combining with a polyolefin an organic additive compound which comprises an aromatic ring having at least two hydrogen-substituted heteroatoms bonded thereto, wherein the organic additive compound is reactive with aldehyde in the polyolefin to form water and a resulting organic compound comprising an unbridged 5- or 6-member ring including the at least two heteroatoms; and forming a container or closure comprising the polyolefin.

14. The container of claim 13 wherein the container is a preform.

15. The container or closure of claim 13 wherein the polyolefin is a polypropylene or polyethylene.

16. A packaged beverage comprising a beverage disposed in the container of claim 13.

17. A composition for use in making a polyolefin item with decreased aldehyde content comprising:

a polyolefin, and an organic additive compound which comprises an aromatic ring having at least two hydrogen-substituted heteroatoms bonded to carbons of the organic additive compound such that the organic additive compound is reactive with aldehyde in the polyolefin to form water and a resulting organic compound comprising an unbridged 5- or 6-member ring including the at least two heteroatoms.

18. The composition of claim 17 wherein the polyolefin is a polypropylene or polyethylene.

19. The composition of claim 18 further comprising erucamide incorporated into the polyolefin.

20. A method for making a packaged beverage comprising:

combining with a polyolefin an organic additive compound which comprises an aromatic ring having at least two hydrogen-substituted heteroatoms bonded to carbons of the organic additive compound such that the organic additive compound is reactive with aldehyde in the polyolefin to form water and a resulting organic compound comprising an unbridged 5- or 6-member ring including the at least two heteroatoms;

forming a packaging container from the polyolefin; and filling the packaging container with a beverage.

21. A method for decreasing aldehyde content of a polyolefin comprising:

incorporating anthranilamide into a polyolefin in an amount effective to react with aldehyde in the polyolefin.

22. The method of claim 21, wherein the amount is between about 10 and about 1000 ppm.

23. The method of claim 21, wherein the amount is between about 200 and about 500 ppm.

24. The method of claim 21, wherein the polyolefin comprises polypropylene or polyethylene.

25. A container or closure made in accordance with a method comprising:

incorporating anthranilamide into a polyolefin in an amount effective to react with aldehyde in the polyolefin; and forming a container or closure comprising the polyolefin which has the anthranilamide incorporated therein.

26. A composition for use in making a polyolefin item with decreased aldehyde content comprising:

a polyolefin; and anthranilamide in an amount effective to react with aldehyde in the polyolefin.

27. The composition of claim 26, wherein the polyolefin is a polypropylene or polyethylene.

28. The composition of claim 26, further comprising erucamide incorporated into the polyolefine.

29. A method for making a packaged beverage comprising:

providing a polyolefin;

combining anthranilamide in an amount effective to react with aldehyde in the polyolefin;

forming a packaging container from the combined polyolefin and anthranilamide; and filling the packaging container with a beverage.

* * * * *

UNITED STATES PATENT AND TRADEMARK OFFICE
CERTIFICATE OF CORRECTION

PATENT NO.     : 6,632,874 B2
DATED          : October 14, 2003
INVENTOR(S)    : Rule et al.

It is certified that error appears in the above-identified patent and that said Letters Patent is hereby corrected as shown below:

Column 6,
Line 28, Claim 1 should be cancelled and replaced in its entirety by the following claim 1:

1. A method for decreasing aldehyde content of a polyolefin comprising:
    combining with the polyolefin an organic additive compound which comprises an
        aromatic ring having at least two hydrogen-substituted heteroatoms bonded thereto,
    wherein the organic additive compound is reactive with aldehyde in the polyolefin to
        form water and a resulting organic compound comprising an unbridged 5- or 6-
        member ring including the at least two heteroatoms.

Signed and Sealed this

Thirty-first Day of August, 2004

JON W. DUDAS
*Director of the United States Patent and Trademark Office*